US011908306B2

(12) United States Patent
Saito

(10) Patent No.: US 11,908,306 B2
(45) Date of Patent: Feb. 20, 2024

(54) RESCUE REQUEST APPARATUS, RESCUE REQUEST METHOD, AND NON-TRANSITORY COMPUTER READABLE MEDIUM

(71) Applicant: NEC Platforms, Ltd., Kawasaki (JP)

(72) Inventor: Naruki Saito, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 879 days.

(21) Appl. No.: 16/961,434

(22) PCT Filed: Nov. 16, 2018

(86) PCT No.: PCT/JP2018/042512
§ 371 (c)(1),
(2) Date: Jul. 10, 2020

(87) PCT Pub. No.: WO2019/138690
PCT Pub. Date: Jul. 18, 2019

(65) Prior Publication Data
US 2020/0357266 A1 Nov. 12, 2020

(30) Foreign Application Priority Data
Jan. 15, 2018 (JP) ................................. 2018-004230

(51) Int. Cl.
*G08B 25/01* (2006.01)
*G08B 25/10* (2006.01)
(Continued)

(52) U.S. Cl.
CPC ............ *G08B 25/016* (2013.01); *G01S 19/17* (2013.01); *G01S 19/393* (2019.08); *G06T 7/20* (2013.01);
(Continued)

(58) Field of Classification Search
None
See application file for complete search history.

(56) References Cited

U.S. PATENT DOCUMENTS 9,915,945 B2\* 3/2018 Fox .................... G01S 19/17
10,042,034 B2\* 8/2018 Kaio ................... G01S 5/0231
2019/0104496 A1 4/2019 Sogo et al.

FOREIGN PATENT DOCUMENTS

JP 2010-130598 A 6/2010
JP 2012-138653 A 7/2012
(Continued)

OTHER PUBLICATIONS

International Search Report for PCT Application No. PCT/JP2018/042512, dated Jan. 22, 2019.
(Continued)

*Primary Examiner* — Kenneth B Wells

(57) ABSTRACT

A rescue request apparatus (1) includes a radio communication unit (2) configured to perform radio communication, a trajectory acquisition unit (3) configured to acquire a movement trajectory of the rescue request apparatus when the radio communication cannot be performed by the radio communication unit (2), a user-state determination unit (4) configured to determine whether or not a user of the rescue request apparatus is in a dangerous state, and a drive control unit (5) configured to drive and control the rescue request apparatus so as to trace the movement trajectory acquired by the trajectory acquisition unit (3) when the user-state determination unit (4) determines that the user is in the dangerous state. The radio communication unit (2) transmits a rescue request signal to a pre-registered destination when the radio communication becomes possible.

14 Claims, 10 Drawing Sheets

(51) Int. Cl.
*G08B 21/18* (2006.01)
*G10L 15/22* (2006.01)
*G06T 7/20* (2017.01)
*H04N 5/225* (2006.01)
*H04N 5/232* (2006.01)
*G01S 19/17* (2010.01)
*G01S 19/39* (2010.01)
*H04N 23/54* (2023.01)
*H04N 23/60* (2023.01)
*G01S 19/47* (2010.01)

(52) U.S. Cl.
CPC ........... *G08B 21/182* (2013.01); *G08B 25/10* (2013.01); *G10L 15/22* (2013.01); *H04N 23/54* (2023.01); *H04N 23/60* (2023.01); *G01S 19/47* (2013.01); *G06T 2207/30241* (2013.01); *G10L 2015/223* (2013.01)

(56) References Cited

FOREIGN PATENT DOCUMENTS

| | | |
|---|---|---|
| JP | 2013-142915 A | 7/2013 |
| JP | 2016-138859 A | 8/2016 |
| JP | 2017-228178 A | 12/2017 |
| JP | 2018-005878 A | 1/2018 |
| JP | 2018-094983 A | 6/2018 |
| KR | 2017-0060324 A | 6/2017 |

OTHER PUBLICATIONS

Japanese Office Action for JP Application No. 2019-024278 dated Dec. 10, 2019 with English Translation.

\* cited by examiner

RESCUE REQUEST APPARATUS, RESCUE REQUEST METHOD, AND NON-TRANSITORY COMPUTER READABLE MEDIUM

This application is a National Stage Entry of PCT/JP2018/042512 filed on Nov. 16, 2018, which claims priority from Japanese Patent Application 2018-004230 filed on Jan. 15, 2018, the contents of all of which are incorporated herein by reference, in their entirety.

TECHNICAL FIELD

The present disclosure relates to a rescue request apparatus, a rescue request method, and a non-transitory computer readable medium.

BACKGROUND ART

In recent years, the number of persons who get lost in mountains has been increasing. Information about persons who get lost in mountains or accidents involving such persons is still reported in news. Therefore, relevant techniques for immediately detecting and rescuing persons who get lost in mountains have been studied (e.g., Patent Literature 1).

Patent Literature 1 discloses that when a user falls off, or meets with an accident such as an avalanche, the moving trajectory of the user is calculated based on positions measured by a GPS (Global Positioning System) and a rescue signal is transmitted from a place where the user has stopped his/her movement.

CITATION LIST

Patent Literature

Patent Literature 1: Japanese Unexamined Patent Application Publication No. 2013-142915

SUMMARY OF INVENTION

Technical Problem

However, the technique disclosed in Patent Literature 1 is based on the premise that radio communication can be performed at the place where the user stops his/her movement. Therefore, if radio communication cannot be performed at the place where the user stops his/her movement, no rescue signal can be transmitted. That is, even if the technique disclosed in Patent Literature 1 is used, it is impossible to request to rescue the user when radio communication cannot be performed. Therefore, it is desired to develop a technique by which the reliability of a rescue request is improved even in such a situation.

An object of this disclosure is to solve such a problem and to provide a rescue request apparatus, a rescue request method, and a non-transitory computer readable medium capable of improving the reliability of a rescue request.

Solution to Problem

A rescue request apparatus according to a first aspect includes:
a radio communication unit configured to perform radio communication;
a trajectory acquisition unit configured to acquire a movement trajectory of the rescue request apparatus when the radio communication cannot be performed by the radio communication unit;
a user-state determination unit configured to determine whether or not a user is in a dangerous state; and
a drive control unit configured to drive and control the rescue request apparatus so as to trace the movement trajectory when the user-state determination unit determines that the user is in the dangerous state, in which
the radio communication unit transmits a rescue request signal to a pre-registered destination when the radio communication becomes possible.

A rescue request method according to a second aspect includes:
acquiring a movement trajectory of an own apparatus when radio communication cannot be performed by a radio communication unit configured to perform radio communication;
determining whether or not a user is in a dangerous state;
driving and controlling the own apparatus so as to trace the movement trajectory when it is determined that the user is in the dangerous state; and
transmitting a rescue request signal to a pre-registered destination when the radio communication becomes possible.

A non-transitory computer readable medium according to a third aspect is a non-transitory computer readable medium storing a program for causing a computer to perform:
acquiring a movement trajectory of an own apparatus when radio communication cannot be performed by a radio communication unit configured to perform radio communication;
determining whether or not a user is in a dangerous state;
driving and controlling the own apparatus so as to trace the acquired movement trajectory when it is determined that the user is in the dangerous state; and
transmitting a rescue request signal to a pre-registered destination when the radio communication becomes possible.

Advantageous Effects of Invention

According to the above-described aspect, it is possible to improve the reliability of a rescue request.

DESCRIPTION OF EMBODIMENTS

Example embodiments will be described hereinafter with reference to the drawings. Note that in the example embodiments, the same symbols are assigned to the same components and redundant descriptions are omitted.

Overview of Example Embodiment

Figure 1:
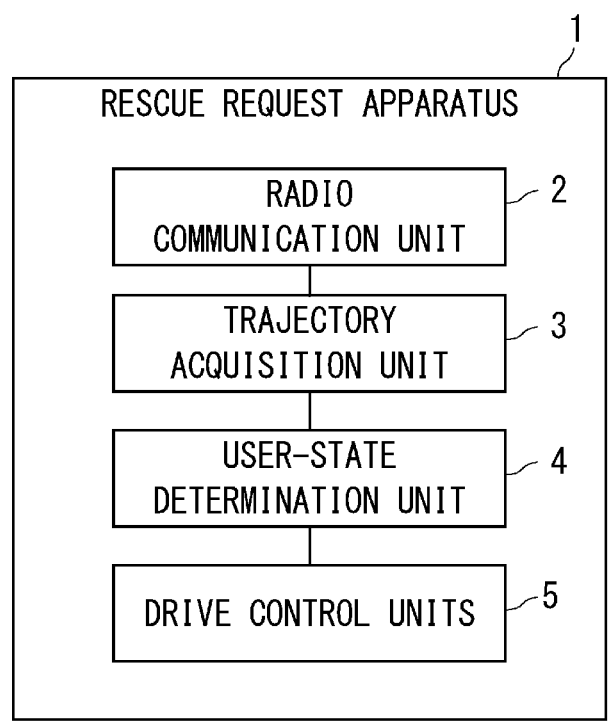
FIG. 1 is a block diagram showing an example of a configuration of a rescue request apparatus according to an outline of an example embodiment.

Firstly, prior to describing an example embodiment, an outline of the example embodiment will be described. A rescue request apparatus 1 according to an outline of an example embodiment will be described with reference to FIG. 1. FIG. 1 is a block diagram showing an example of a configuration of a rescue request apparatus according to the outline of the example embodiment.

The rescue request apparatus 1 is, for example, a mobile body that can autonomously move such as an unmanned mobile machine (also referred to as a drone), a robot, and an autonomously-driving vehicle. The rescue request apparatus 1 includes a radio communication unit 2, a trajectory acquisition unit 3, a user-state determination unit 4, and a drive control unit 5.

The radio communication unit 2 is a communication unit that performs radio communication through a radio channel. The radio communication unit 2 may perform radio communication through a mobile network through which a telecommunication carrier provides services. Alternatively, the radio communication unit 2 may perform radio communication through a wireless LAN (Local Area Network). Alternatively, the radio communication may be radio communication through a wireless MAN (Metropolitan Area Network) or through ZigBee.

The radio communication unit 2 determines whether radio communication can be performed or cannot be performed. Further, the radio communication unit 2 transmits a rescue request signal to a pre-registered destination when the radio communication becomes possible while the drive control unit 5 (which will be described later) is driving the rescue request apparatus 1. The pre-registered destination may be, for example, an institution such as a fire station, a police station or a hospital, or a member of a user's family. Alternatively, the pre-registered destination may be a head of a group to which the user belongs, or may be arbitrarily determined by the user.

When the radio communication unit 2 cannot perform radio communication, the trajectory acquisition unit 3 acquires a movement trajectory of the rescue request apparatus 1.

The user-state determination unit 4 determines whether or not the user of the rescue request apparatus 1 is in a dangerous state. The user-state determination unit 4 may determine that the user is in a dangerous state when, for example, the user utters a term indicating a rescue request such as a term "SOS". Alternatively, the user-state determination unit 4 may determine that the user is in a dangerous state based on sensor information acquired by a sensor that acquires information about the state of the rescue request apparatus 1 or a sensor that acquires biological information of the user.

When the user-state determination unit 4 determines that the user is in a dangerous state, the drive control unit 5 drives and controls the rescue request apparatus 1 so as to trace the movement trajectory acquired by the trajectory acquisition unit 3. The movement trajectory is a movement trajectory whose start point position is a place where radio communication becomes impossible and whose end point position is a place where the user-state determination unit 4 determines the user is in the dangerous state. The drive control unit 5 drives and controls the rescue request apparatus 1 so as to trace the movement trajectory by using the acquired end point position as a driving start position and using the acquired start point position as an end position.

As described above, the rescue request apparatus 1 acquires a movement trajectory when radio communication becomes impossible. In other words, the rescue request apparatus 1 acquires a movement trajectory when the user enters a communication impossible area. Further, when it is determined that the user is in a dangerous state, the rescue request apparatus 1 drives and controls the rescue request apparatus 1 so as to trace the movement trajectory, and then transmits a rescue request signal at the moment when radio communication becomes possible. Therefore, even when the user makes a rescue request in a state in which, for example, the user has entered a communication impossible area and has gotten lost there, the rescue request apparatus 1 drives and controls the rescue request apparatus 1 to a place where the rescue request apparatus 1 can reliably perform radio communication, and transmits a rescue request signal from there. Therefore, according to the rescue request apparatus 1, it is possible to improve the reliability of the rescue request.

First Example Embodiment

Figure 2:
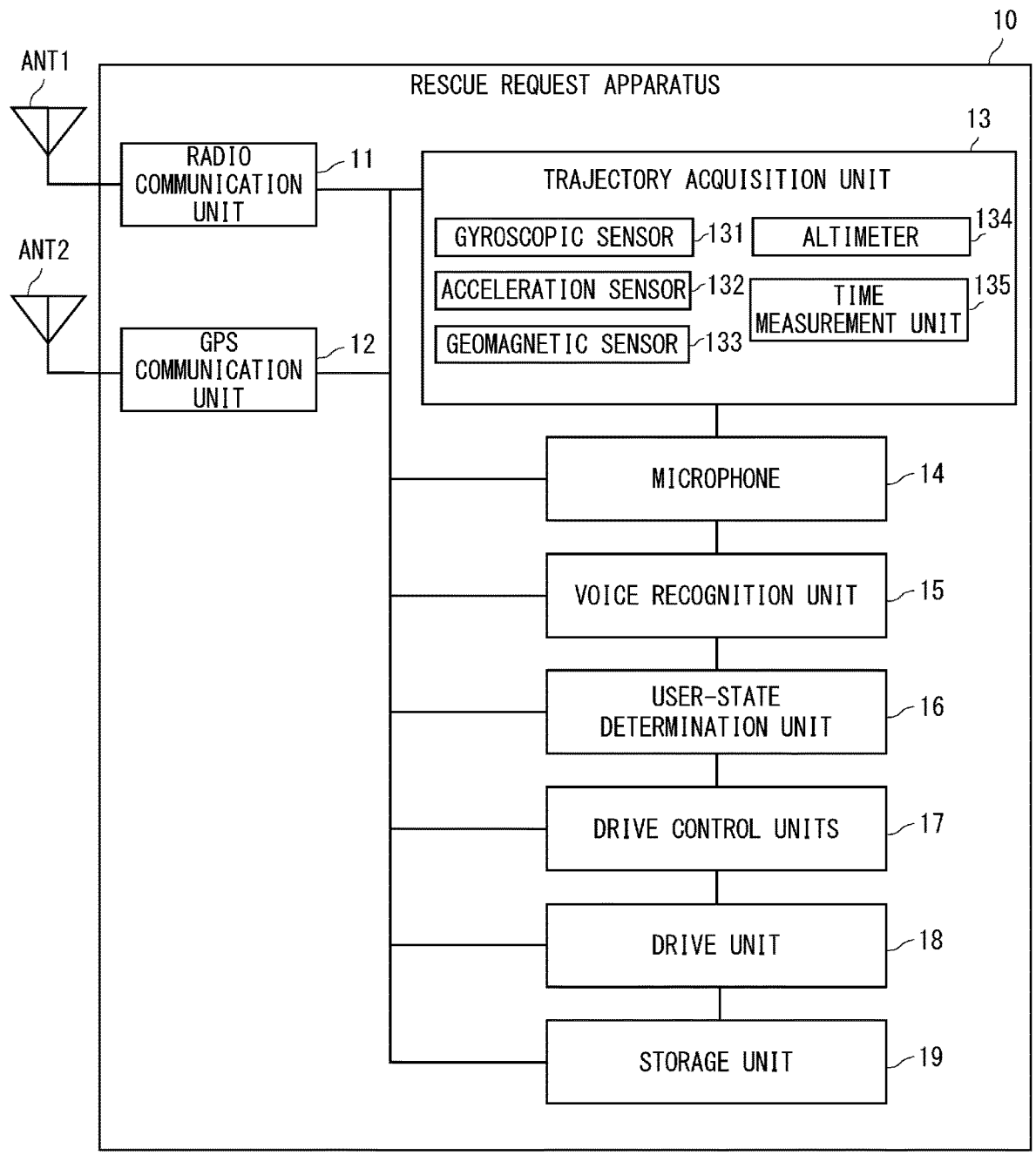
FIG. 2 is a block diagram showing an example of a configuration of a rescue request apparatus according to a first example embodiment.

Example embodiments according to the present disclosure will be described hereinafter with reference to the drawings. Firstly, a rescue request apparatus 10 according to the first example embodiment will be described with reference to FIG. 2. FIG. 2 is a block diagram showing an example of a configuration of a rescue request apparatus according to the first example embodiment. The rescue request apparatus 10 according to the first example embodiment corresponds to the rescue request apparatus 1 according to the outline of the example embodiment. The rescue request apparatus 10 is an apparatus that makes a rescue request when a user needs to be rescued. Note that for the sake of explanation, the following descriptions are given on the assumption that the rescue request apparatus 10 is a drone.

The rescue request apparatus 10 includes a radio communication unit 11, a GPS communication unit 12, a trajectory acquisition unit 13, a microphone 14, a voice recognition unit 15, a user-state determination unit 16, a drive control unit 17, a drive unit 18, and a storage unit 19.

The radio communication unit 11 corresponds to the radio communication unit 2 according to the outline of the example embodiment. The radio communication unit 11 is a communication unit that performs radio communication by using a radio channel through an antenna ANT1. For the sake of explanation, the following descriptions are given on the assumption that the radio communication unit 11 performs radio communication through a mobile network through which a telecommunication carrier provides services.

The radio communication unit 11 measures the signal strength of a radio wave transmitted from a base station and determines whether or not the measured signal strength is strong enough to perform radio communication. The radio communication unit 11 determines whether or not the measured signal strength is strong enough to perform radio communication based on whether or not the signal strength of the radio wave received from the base station is equal to or larger than a predetermined threshold. When the radio communication unit 11 determines that radio communication cannot be performed, it notifies the trajectory acquisition unit 13 (which will be described later) of the determination result.

Further, the radio communication unit 11 transmits a rescue request signal to a pre-registered destination when the radio communication becomes possible while the drive control unit 17 (which will be described later) is driving the rescue request apparatus 10. The rescue request signal may be, for example, a signal indicating information including the name of the user, the fact that he/she has gotten lost, and the fact that he/she is requesting a rescue.

The rescue request signal may be a signal indicating, in addition to the aforementioned items, information about the movement trajectory acquired by the trajectory acquisition unit 13 (which will be described later) and a time that has been taken for the movement from the start point position of the movement trajectory to the end point position thereof.

The information about the movement trajectory may be a rescue MAP that is obtained by mapping the movement trajectory and the time required for the movement onto map information that is stored in advance in the storage unit 19 (which will be described later). Further, the information about the movement trajectory may include information in which a straight line connecting the start point position of the movement trajectory to the end point position thereof is defined as a shortest route. When the place where it is determined that radio communication cannot be performed is different from a place where it is determined that positioning by a GPS signal cannot be performed, the information about the movement trajectory may be information about a movement trajectory whose start point position is the place where it is determined that the positioning by the GPS signal cannot be performed.

The GPS communication unit 12 is a communication unit that receives GPS signals through the antenna ANT2 and performs positioning by using the received GPS signals. Further, the GPS communication unit 12 measures the signal strength of the received GPS signal and determines whether or not the positioning using the GPS signal is possible. The GPS communication unit 12 determines whether or not the positioning is possible based on whether or not the signal strength of the GPS signal is equal to or larger than a predetermined threshold. When the GPS communication unit 12 determines that the positioning cannot be performed, it notifies the trajectory acquisition unit 13 (which will be described later) of the determination result.

The trajectory acquisition unit 13 corresponds to the trajectory acquisition unit 3 according to the outline of the example embodiment. The trajectory acquisition unit 13 acquires a movement trajectory of the rescue request apparatus 10 when at least one of the following conditions is satisfied: a condition that the radio communication unit 11 determines that radio communication cannot be performed; and a condition that the GPS communication unit 12 determines that positioning by a GPS signal cannot be performed.

Specifically, the trajectory acquisition unit 13 starts acquiring the movement trajectory of the rescue request apparatus 10 by using, as its start point position, a place where at least one of the following conditions is satisfied: the condition that it is determined that radio communication cannot be performed; and the condition that it is determined that positioning by a GPS signal cannot be performed. When the trajectory acquisition unit 13 starts acquiring the movement trajectory, it establishes a three-axis coordinate system whose origin coincides with the position of the start point position of the movement trajectory, and acquires the movement trajectory by using the established three-axis coordinate system. That is, the trajectory acquisition unit 13 acquires the movement trajectory while using the position where the acquisition of the movement trajectory is started as the origin (0, 0, 0) of the coordinate system.

By using a geomagnetic sensor 133 (which will be described later), the trajectory acquisition unit 13 can establish a three-axis coordinate system in which: the y-axis positive direction is in parallel with the north direction; the x-axis positive direction is in parallel with the east direction; and the z-axis positive direction is in parallel with the upward direction when the ground surface is used as the reference plane. Note that the trajectory acquisition unit 13 may define the north direction as the x-axis direction or may adopt other types of three axes as long as three axes can be defined. Further, in the following description, coordinates using three axes are expressed as coordinates (x, y, z).

Further, the trajectory acquisition unit 13 may establish a coordinate system in which, for example, a coordinate is incremented or decremented by one for every 500 m. The following description is given by using a coordinate system in which a coordinate is incremented or decremented by one for every 500 m. Alternatively, the trajectory acquisition unit 13 may establishes a coordinate system in which, for example, a coordinate is incremented or decremented by one for every 1 km.

The trajectory acquisition unit 13 successively calculates and acquires the movement trajectory of the rescue request apparatus 10 by using a group of sensors 131 to 133, an altimeter 134, and a time measurement unit 135 (all of which will be described later), and stores the acquired movement trajectory in the storage unit 19. Since the trajectory acquisition unit 13 can calculate the moving direction and the moving distance of the rescue request apparatus 10 by using the group of sensors 131 to 133, the altimeter 134, and the time measurement unit 135, it acquires the movement trajectory of the rescue request apparatus 10 by calculating and acquiring the position of the rescue request apparatus 10 at each unit time such as every 5 minutes. The trajectory acquisition unit 13 associates coordinates of the position of the rescue request apparatus 10 with the elapsed time and stores them in the storage unit 19. Note that when positioning by a GPS signal is possible, the trajectory acquisition unit 13 can acquire the current position, so that it may acquire the current position by using the result of the positioning by the GPS signal and store it in the storage unit 19.

When the user-state determination unit 16 (which will be described later) determines that a user using the rescue request apparatus 10 is in a dangerous state, the trajectory acquisition unit 13 terminates the acquisition of the movement trajectory along which the rescue request apparatus 10 has moved. That is, the trajectory acquisition unit 13 acquires the movement trajectory whose end point position is this position. The trajectory acquisition unit 13 includes a gyroscopic sensor 131, an acceleration sensor 132, a geomagnetic sensor 133, an altimeter 134, and a time measurement unit 135.

The gyroscopic sensor 131 detects a rotational angular speed of the rescue request apparatus 10. The gyroscopic sensor 131 is a gyroscopic sensor capable of detecting rotational angular speeds around three axes or more. It is possible to calculate the rotation angle of the rescue request apparatus 10 by first-order integrating the value detected by the gyroscopic sensor 131. Therefore, by using the gyroscopic sensor 131, even if the rescue request apparatus 10 is rotated, it is possible to detect how the rescue request apparatus has been rotated and thereby to detect the traveling direction of the rescue request apparatus 10.

The acceleration sensor 132 detects an acceleration of the rescue request apparatus 10. The acceleration sensor 132 is an acceleration sensor capable of detecting accelerations on three axes or more. It is possible to calculate the moving distance by second-order integrating the value detected by the acceleration sensor 132. Therefore, by using the acceleration sensor 132, it is possible to calculate the moving distance by which the rescue request apparatus 10 has moved. Note that it is possible to calculate the moving speed by first-order integrating the value detected by the acceleration sensor 132. Therefore, the moving distance may be calculated by using a time measured by the time measurement unit 135 (which will be described later).

The geomagnetic sensor 133 detects a direction. The geomagnetic sensor 133 is a three-axis-type geomagnetic sensor. It is possible to define three axes by using the geomagnetic sensor 133, so that the trajectory acquisition unit 13 acquires the movement trajectory of the rescue request apparatus 10 by using the defined three axes.

The altimeter 134 detects a displacement in altitude. By using the altimeter 134, the trajectory acquisition unit 13 enables the rescue request apparatus 10 to acquire the moving distance in the z-axis direction.

The time measurement unit 135 starts measuring an elapsed time when the acquisition of the movement trajectory is started, and thereby measures the elapsed time until the acquisition of the movement trajectory is terminated.

As described above, the trajectory acquisition unit 13 obtains the moving distance and the moving direction of the rescue request apparatus 10 by using the value detected by the gyroscopic sensor 131, the value detected by the acceleration sensor 132, the value detected by the geomagnetic sensor 133, and the value detected by the altimeter 134. Further, the trajectory acquisition unit 13 obtains the elapsed time from the start of the acquisition of the movement trajectory of the rescue request apparatus 10 to the end of the acquisition thereof by using the time measurement unit 135. Therefore, the trajectory acquisition unit 13 can acquire the movement trajectory of the rescue request apparatus 10 by calculating and acquiring the position of the rescue request apparatus 10 at each unit time.

Figure 3:
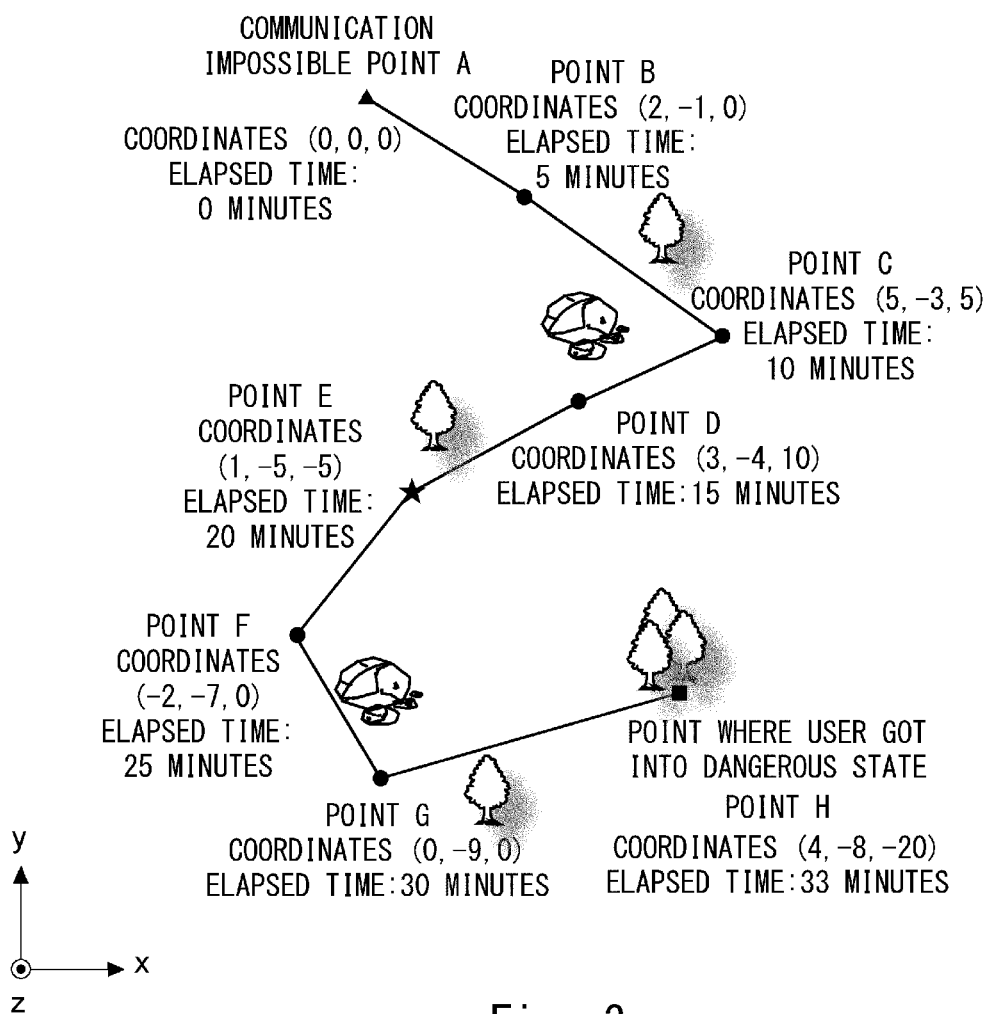
FIG. 3 is a diagram for explaining a movement trajectory acquired by a trajectory acquisition unit.

A movement trajectory acquired by the trajectory acquisition unit 13 will be described hereinafter with reference to FIG. 3. FIG. 3 is a diagram for explaining a movement trajectory acquired by the trajectory acquisition unit. It is assumed that, as described above, the trajectory acquisition unit 13 calculates and acquires the current position every five minutes by using the group of sensors 131 to 133, the altimeter 134, and the time measurement unit 135, and associates the acquired position with the elapsed time and stores them in the storage unit 19.

Firstly, the radio communication unit 11 determines that radio communication becomes impossible at a point A. Then, as shown in FIG. 3, the trajectory acquisition unit 13 defines three axes, sets the point A at the origin coordinates of the coordinate system, and sets the elapsed time to 0 minute. Next, it is assumed that, five minutes later, the rescue request apparatus 10 has moved with the user to a point B. The trajectory acquisition unit 13 acquires the position of the point B and the elapsed time, associates them with each other, and stores them in the storage unit 19. After that, until the user-state determination unit 16 (which will be described later) determines that the user is in a dangerous state, the trajectory acquisition unit 13 acquires, after the point C, a position and an elapsed time, associates them with each other, and stores them in the storage unit 19 every five minutes. Here, it is assumed the user-state determination unit 16 determines that the user is in a dangerous state at a point H. Then, the trajectory acquisition unit 13 defines the point H as an end point position, acquires the position of the point H and the elapsed time, and stores them in the storage unit 19. Note that when the user-state determination unit 16 determines that the user is in a dangerous state, the trajectory acquisition unit 13 immediately acquires the current position and the elapsed time. In this manner, the trajectory acquisition unit 13 acquires a movement trajectory whose start point position is the point A and whose end point position is the point H. Further, for example, if it is determined that positioning by a GPS signal cannot be performed at a point E, the trajectory acquisition unit 13 may store information about the point E in the storage unit 19 as information different from those for the other points so that the trajectory acquisition unit 13 can also identify this position.

Next, the microphone 14 will be described by referring to FIG. 2 again. The microphone 14 picks up a voice uttered by the user of the rescue request apparatus 10. The microphone 14 may be disposed inside the rescue request apparatus 10 or may be disposed outside the rescue request apparatus 10.

When the microphone 14 picks up a voice uttered by the user, the voice recognition unit 15 converts the content of the picked-up voice into text data and thereby recognizes the content of the voice uttered by the user. When the voice recognition unit 15 recognizes a predetermined term indicating a rescue request, such as a term "SOS", it notifies the user-state determination unit 16 of the recognition of the predetermined term. Further, when the voice recognition unit 15 recognizes a predetermined term indicating that the driving and controlling of the rescue request apparatus 10 should be stopped, such as a term "STOP", it notifies the drive control unit 17 of the recognition of the predetermined term.

The user-state determination unit 16 determines whether or not the user of the rescue request apparatus 10 is in a dangerous state. When the voice recognition unit 15 recognizes the term indicating a rescue request such as the term "SOS", the user-state determination unit 16 determines that the user is in a dangerous state. When the user-state determination unit 16 determines that the user is in a dangerous state, it notifies the trajectory acquisition unit 13 and the drive control unit 17 of the determination result.

When the user-state determination unit 16 determines that the user is in a dangerous state, the drive control unit 17 drives and controls the rescue request apparatus 10 so as to trace the acquired movement trajectory. Specifically, the drive control unit 17 controls and drives the rescue request apparatus 10 so as to trace the acquired movement trajectory from the end point position of the movement trajectory to the start point position thereof. For example, assuming that the trajectory acquisition unit 13 has acquired the movement trajectory shown in FIG. 3, the drive control unit 17 drives and controls the rescue request apparatus 10 so as to trace the movement trajectory from the point H, which is the driving start position, in the order of the point G, the point F, the point E, the point D, the point C, the point B, and the point A.

Further, when the voice recognition unit 15 recognizes a predetermined term indicating that the driving and controlling of the rescue request apparatus 10 should be stopped, such as a term "STOP", the drive control unit 17 determines that the rescue request apparatus 10 has erroneously started moving and hence stops the driving and controlling thereof. When the drive control unit 17 stops the driving and controlling of the rescue request apparatus 10, it drives and controls the rescue request apparatus 10 so as to returns to the place where the user is.

Next, the description is continued by referring to FIG. 2 again.

The drive unit 18 includes a motor and a propeller of the rescue request apparatus 10, and moves (drives) the rescue request apparatus 10 under the control of the drive control unit 17.

The storage unit 19 stores various types of information such as information about the movement trajectory, the elapsed time, and map information.

Figure 4:
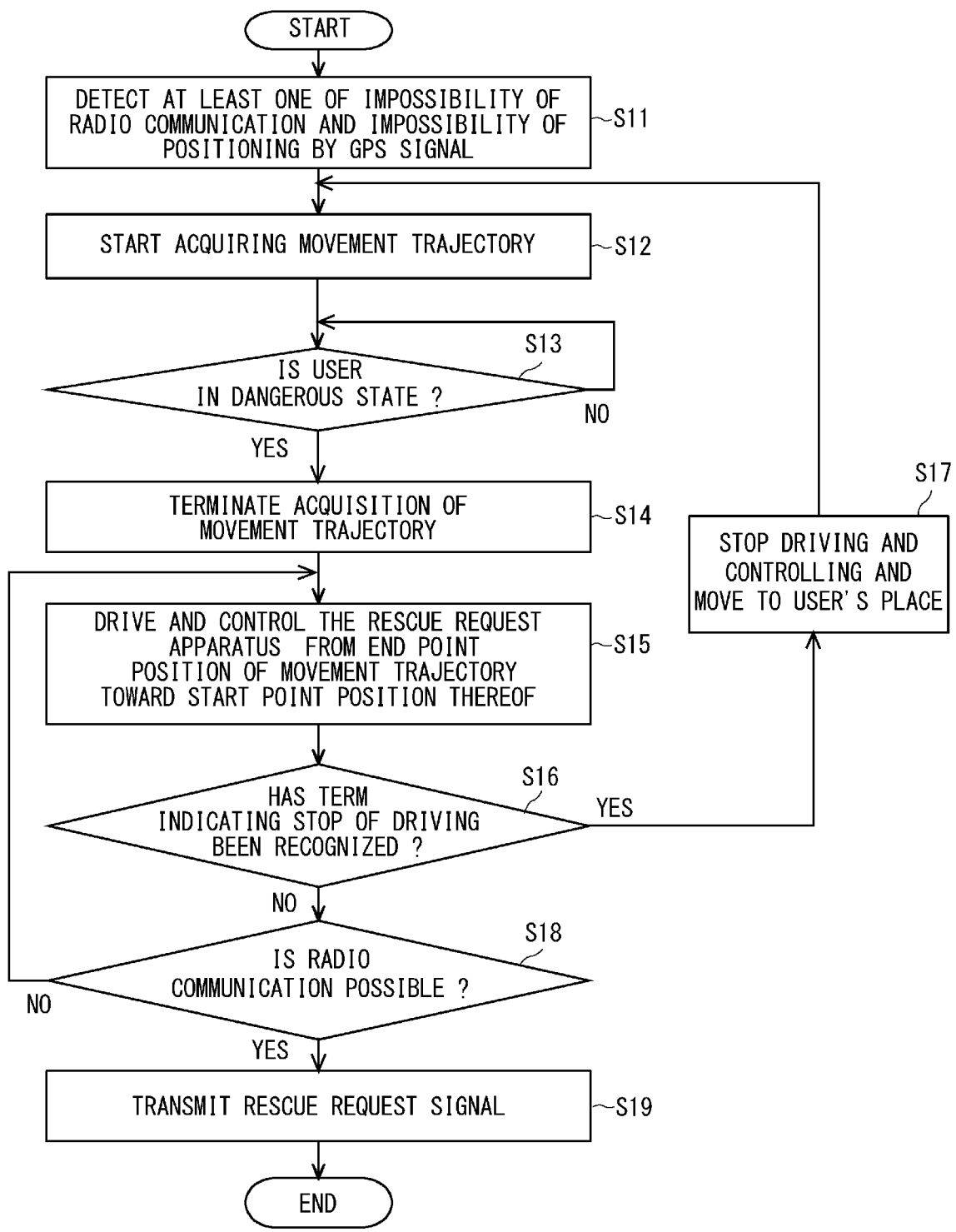
FIG. 4 is a flowchart for explaining an example of operations performed by the rescue request apparatus according to the first example embodiment.

Next, an example of operations performed by the rescue request apparatus 10 according to the first example embodiment will be described with reference to FIG. 4. FIG. 4 is a flowchart for explaining an example of operations performed by the rescue request apparatus according to the first example embodiment.

Firstly, the rescue request apparatus 10 detects at least one of the impossibility of radio communication and the impossibility of positioning by a GPS signal (step S11). Specifically, the radio communication unit 11 determines whether or not the signal strength of a radio wave received from a base station is equal to or larger than a predetermined threshold. Then, when the signal strength is smaller than the predetermined threshold, the radio communication unit 11 determines that radio communication is impossible. When the radio communication unit 11 determines that radio communication cannot be performed, it notifies the trajectory acquisition unit 13 about that. The GPS communication unit 12 determines whether or not positioning is possible based on whether or not the signal strength of a GPS signal is equal to or larger than a predetermined threshold. The GPS communication unit 12 determines that the positioning cannot be performed when the signal strength is smaller than the predetermined threshold. When the GPS communication unit 12 determines that the positioning by the GPS signal cannot be performed, it notifies the trajectory acquisition unit 13 about that.

Next, the rescue request apparatus 10 starts acquiring a movement trajectory (step S12). Specifically, the trajectory acquisition unit 13 establishes a three-axis coordinate system while defining, as the start point position, a place where at least one of the following conditions is satisfied: a condition that it is determined that radio communication cannot be performed; and a condition that it is determined that positioning by a GPS signal cannot be performed. Further, the trajectory acquisition unit 13 sets the start point position as the origin coordinates (0, 0, 0) of the coordinate system. The trajectory acquisition unit 13 calculates and acquires the position of the rescue request apparatus 10 at each unit time by using a value detected by the gyroscopic sensor 131, a value detected by the acceleration sensor 132, a value detected by the geomagnetic sensor 133, and a value detected by the altimeter 134. Further, the trajectory acquisition unit 13 acquires an elapsed time from the start point position by using the time measurement unit 135. The trajectory acquisition unit 13 associates the acquired position with the elapsed time and stores them in the storage unit 19 at each unit time.

Next, the rescue request apparatus 10 determines whether or not the user is in a dangerous state (step S13). Specifically, the user-state determination unit 16 determines whether or not the user is in a dangerous state based on whether or not the voice recognition unit 15 has recognized a term indicating a rescue request such as a term "SOS".

In the step S13, when the user-state determination unit 16 determines that the user is in a dangerous state (Yes at step S13), the process proceeds to a step S14. When the voice recognition unit 15 recognizes the term indicating the rescue request, the user-state determination unit 16 determines that the user is in a dangerous state and notifies the trajectory acquisition unit 13 and the drive control unit 17 of the determination result.

On the other hand, when the user-state determination unit 16 determines that the user is not in a dangerous state in the step S13 (No at step S13), the process returns to the step S13. That is, until the user-state determination unit 16 determines that the user is in a dangerous state, the trajectory acquisition unit 13 continues the acquisition of the movement trajectory of the rescue request apparatus 10.

Next, the rescue request apparatus 10 terminates the acquisition of the movement trajectory (step S14). The trajectory acquisition unit 13 defines a place where it is determined that the user is in a dangerous state as the end point position of the movement trajectory, and terminates the acquisition of the movement trajectory.

Next, the rescue request apparatus 10 drives and controls the rescue request apparatus 10 from the end point position of the movement trajectory toward the start point position thereof (step S15). When it is determined that the user is in a dangerous state, the drive control unit 17 drives and controls the rescue request apparatus 10 from the end point position of the movement trajectory to the start point position thereof so as to trace the acquired movement trajectory. That is, the rescue request apparatus 10 drives and controls the rescue request apparatus 10 toward the place where radio communication can be performed.

Next, the rescue request apparatus 10 periodically determines whether or not it has recognized a term indicating that the driving should be stopped while it is driving and controlling the rescue request apparatus 10 so as to trace the movement trajectory (step S16). Specifically, the rescue request apparatus 10 periodically determines whether or not the voice recognition unit 15 has recognized a term indicating that the driving and controlling of the rescue request apparatus 10 should be stopped, such as a term "STOP".

In the step S16, when the speech recognition unit 15 has recognized a term indicating that the driving and controlling of the rescue request apparatus 10 should be stopped (Yes at step S16), the drive control unit 17 determines that the rescue request apparatus 10 has erroneously started moving, so that the drive control unit 17 stops the driving and controlling thereof, and moves it to the place where the user is (step S17). After that, the process returns to the step S12 and is continued therefrom. That is, when the rescue request apparatus 10 returns to the place where the user is, the trajectory acquisition unit 13 resumes the acquisition of the movement trajectory so as to continuously acquire the movement trajectory, which was terminated in the step S14.

On the other hand, when the voice recognition unit 15 has not recognized any term indicating that the driving and controlling of the rescue request apparatus 10 should be stopped in the step S16 (No at step S16), the drive control unit 17 continuously drives and controls the rescue request apparatus 10 toward the start point position of the movement trajectory.

Next, the rescue request apparatus 10 periodically determines whether or not radio communication is possible (step S18). Specifically, the radio communication unit 11 periodically determines whether or not the signal intensity of a radio wave received from the base station is equal to or larger than the predetermined threshold.

In the step S18, when radio communication becomes possible (Yes at step S18), the rescue request apparatus 10 transmits a rescue request signal to a pre-registered destination (step S19). Specifically, when the signal strength of a radio wave received from the base station becomes equal to or larger than the predetermined threshold, the radio communication unit 11 determines that radio communication is possible and transmits a rescue request signal to the pre-registered destination.

The rescue request signal may be, for example, a signal indicating information including the name of the user, the fact that he/she has gotten lost, and the fact that he/she is requesting a rescue. The rescue request signal may be a signal indicating, in addition to the aforementioned items, information about the movement trajectory acquired by the trajectory acquisition unit 13 and a time that has been taken for the movement from the start point position of the movement trajectory to the end point position thereof.

The information about the movement trajectory may be a table in which relations between the coordinates of points and corresponding elapsed times shown in FIG. 3 are recorded. Alternatively, the information about the movement trajectory may be a rescue MAP that is obtained by mapping the coordinates and the elapsed time of each of the points shown in FIG. 3 onto map information. Alternatively, the information about the movement trajectory may be information about a movement trajectory whose start point position is a place where it is determined that positioning by a GPS signal cannot be performed (i.e., the point E) and whose end point position is the place where it is determined the user is in the dangerous state. Further, when the information about the movement trajectory is the rescue MAP, the information may include information in which a straight line connecting the start point position of the movement trajectory to the end point position thereof is defined as a shortest route.

On the other hand, when radio communication cannot be performed in the step S18 (No at step S18), the rescue request apparatus 10 returns to the step S15 and continues driving and controlling the rescue request apparatus 10 toward the start point position of the movement trajectory. When the signal strength of a radio wave received from the base station is smaller than the predetermined threshold, the radio communication unit 11 determines that radio communication is impossible. Therefore, the radio communication unit 11 returns to the step S15 and the drive control unit 17 continues driving and controlling the rescue request apparatus 10 toward the start point position of the movement trajectory.

As described above, the rescue request apparatus 10 acquires a movement trajectory of the rescue request apparatus 10 when at least one of the following conditions is satisfied: the condition that radio communication becomes impossible; and the condition that the positioning by the GPS signal becomes impossible. Further, when it is determined that the user is in a dangerous state, the rescue request apparatus 10 drives and controls the rescue request apparatus 10 so as to trace the movement trajectory thereof. Then, when radio communication becomes possible, the rescue request apparatus 10 transmits a rescue request signal. Therefore, for example, even when the user has gotten lost in an area where neither the positioning by the GPS signal nor the radio communication can be performed, such as when the user has gotten lost in a cave, the rescue request apparatus 10 drives and controls the apparatus itself to a place where it can reliably perform radio communication, and transmits a rescue request signal from there. Therefore, according to the rescue request apparatus 10, it is possible to improve the reliability of the rescue request.

Further, since the rescue request apparatus 10 transmits a rescue request signal including information about its movement trajectory, a rescuer who rescues its user can quickly find the user even if the place where it is determined that the user is a dangerous state is a place where no GPS signal reach. That is, by using the rescue request apparatus 10, it is possible to reduce the time required to find the user and to improve the reliability of the rescue request.

Further, when it is determined that the user is in a dangerous state, the rescue request apparatus 10 moves so as to trace the movement trajectory. Further, when radio communication becomes possible, the rescue request apparatus 10 transmits a rescue request signal. Therefore, the rescue request apparatus 10 can make a rescue request even when its user is unable to move.

Second Example Embodiment

Figure 5:
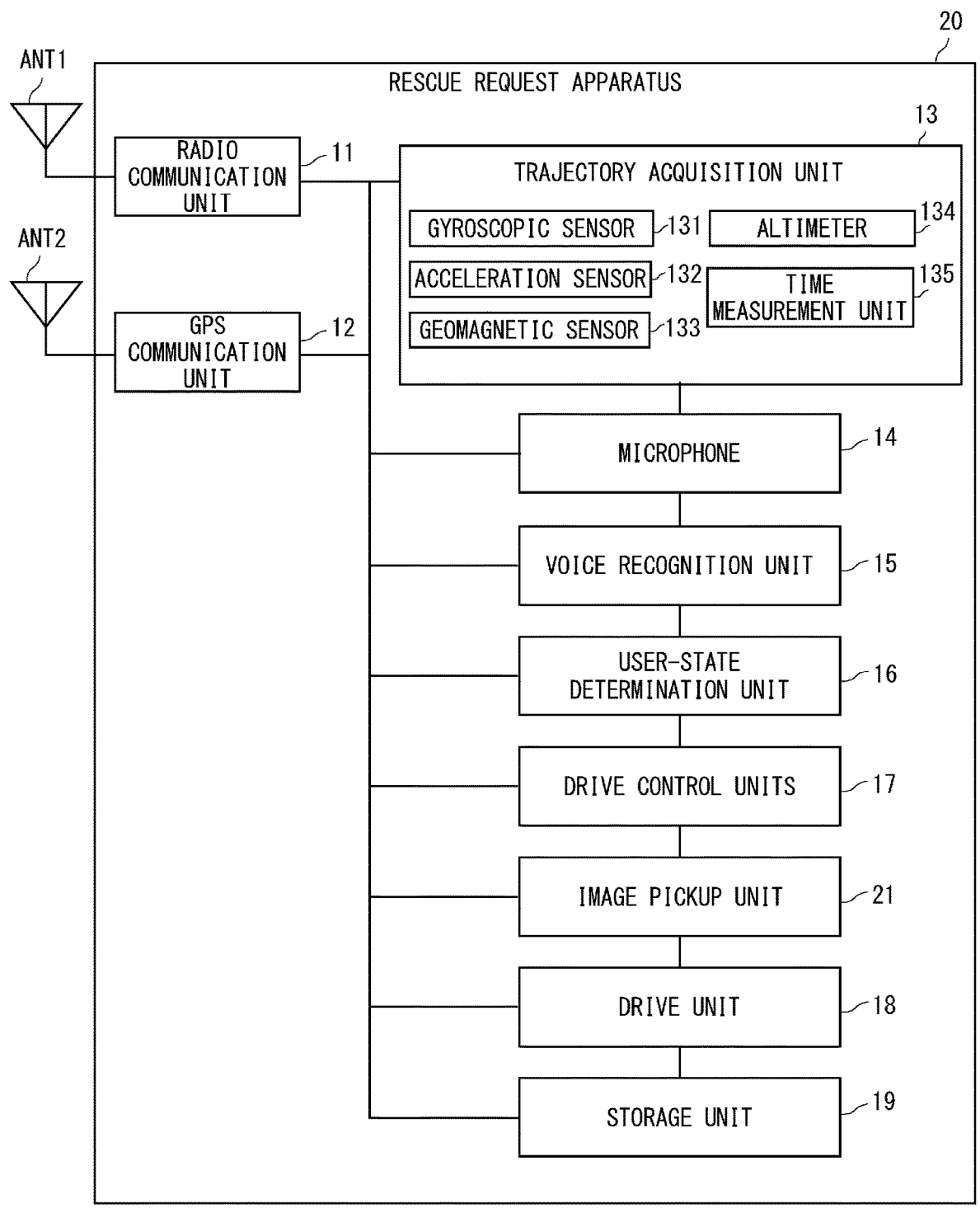
FIG. 5 is a block diagram showing an example of a configuration of a rescue request apparatus according to a second example embodiment.

Next, a second example embodiment will be described. The second example embodiment is a modified example of the first example embodiment. An example of a configuration of a rescue request apparatus 20 according to the second example embodiment will be described with reference to FIG. 5. FIG. 5 is a block diagram showing an example of a configuration of the rescue request apparatus according to the second example embodiment.

The rescue request apparatus 20 according to the second example embodiment further includes an image pickup unit 21 in addition to the configuration of the first example embodiment. Further, the rescue request signal in the second example embodiment differs from that in the first example embodiment. Note that the rest of the configuration is similar to that of the first example embodiment and hence only the differences therefrom will be described in this example embodiment.

When the user-state determination unit 16 determines that a user is in a dangerous state, the image pickup unit 21 photographs surroundings of the rescue request apparatus 20 including the user and thereby generates images thereof. The image pickup unit 21 may be composed of, for example, a camera that is used to take still images or moving images. Alternatively, the image pickup unit 21 may be composed of a digital camera or a video camera.

Further, the image pickup unit 21 successively photographs surroundings of the rescue request apparatus 20 and generates images thereof while the rescue request apparatus 20 is moving so as to trace the movement trajectory from the end point position to the start point position. The image pickup unit 21 stores the generated images in the storage unit 19. The radio communication unit 11 incorporates the image generated by the image pickup unit 21 into the rescue request signal and transmits the resultant rescue request signal.

Figure 6:
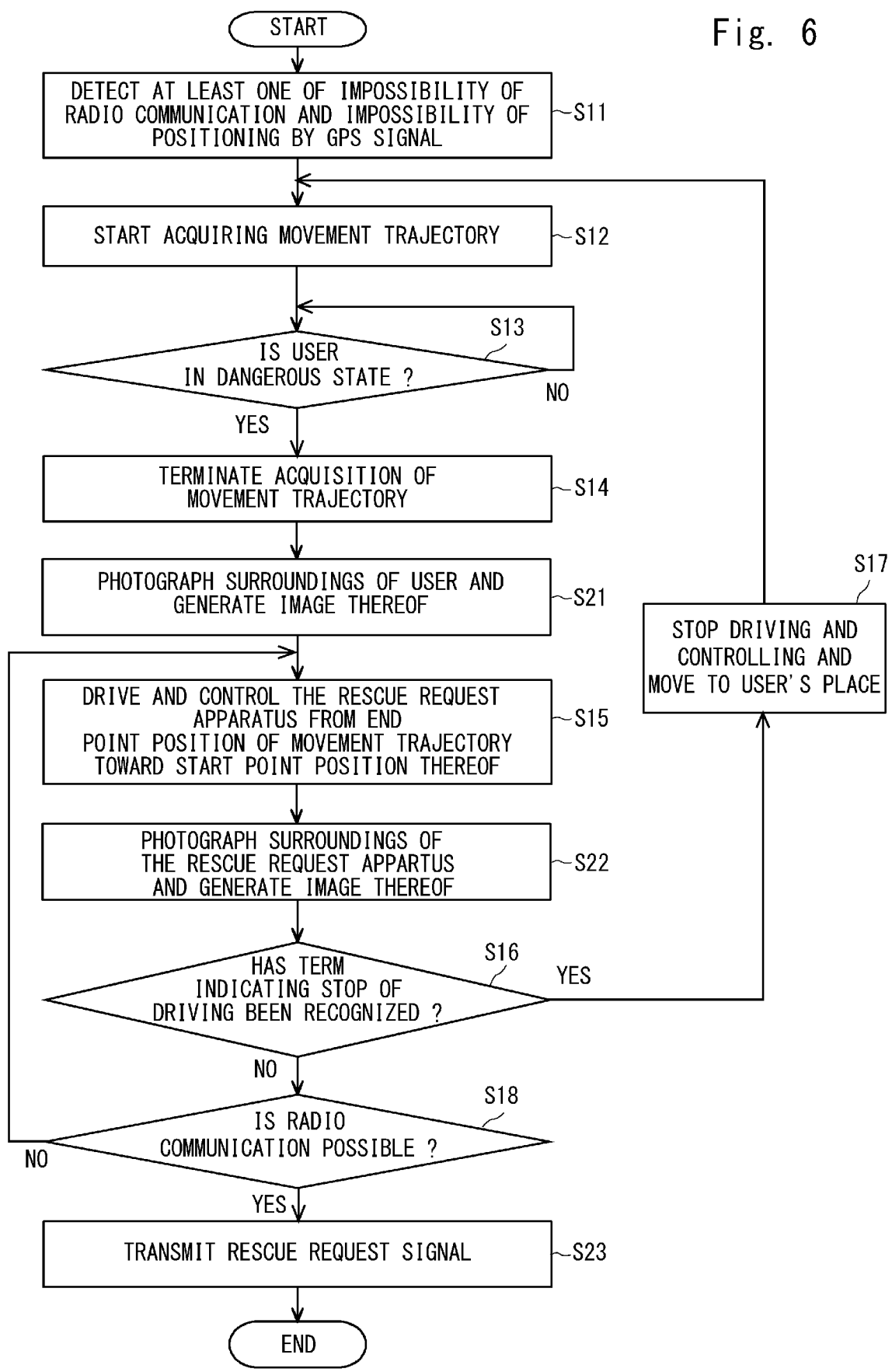
FIG. 6 is a flowchart for explaining an example of operations performed by the rescue request apparatus according to the second example embodiment.

Next, an example of operations performed by the rescue request apparatus 20 according to the second example embodiment will be described with reference to FIG. 6. FIG. 6 is a flowchart for explaining an example of operations performed by the rescue request apparatus according to the second example embodiment. The flowchart shown in FIG. 6 corresponds to that shown in FIG. 3, but includes additional steps S21 and S22 as compared to the flowchart shown in FIG. 3. Further, in FIG. 6, the step S19 in the flowchart shown in FIG. 3 is replaced by a step S23. In FIG. 6, the same reference numerals are assigned to processes similar to those in FIG. 3 and descriptions thereof will be omitted. That is, only the steps S21, S22 and S23 will be described.

When it is determined that the user is in a dangerous state (Yes at step S13), the rescue request apparatus 20 terminates the acquisition of the movement trajectory (step S14), and photographs surroundings including the user and thereby generates images thereof (step S21). Specifically, when the user-state determination unit 16 determines that the user is in a dangerous state, the trajectory acquisition unit 13 terminates the acquisition of the movement trajectory. Then, the image pickup unit 21 photographs surroundings including the user and thereby generates images thereof. The image pickup unit 21 stores the generated images in the storage unit 19.

The rescue request apparatus 20 generates images by photographing surroundings of the rescue request apparatus 20 while it is driving and controlling the apparatus itself (step S22). Specifically, when the user-state determination unit 16 determines that the user is in a dangerous state, the drive control unit 17 drives and controls the rescue request apparatus 20 from the end point position of the movement trajectory to the start point position thereof so as to trace the movement trajectory. While the rescue request apparatus 20 is moving so as to trace the movement trajectory, the image pickup unit 21 successively photographs surroundings of the rescue request apparatus 20 and thereby successively generates images thereof. The image pickup unit 21 stores the generated images in the storage unit 19.

Further, when radio communication becomes possible in the step S18 (Yes at step S18), the radio communication unit 11 incorporates the images generated by the image pickup unit 21 into the rescue request signal and transmits the resultant rescue request signal to the pre-registered destination (step S23).

As described above, since this example embodiment also has a configuration similar to that of the first example embodiment, it is also possible to improve the reliability of the rescue request.

Further, when it is determined that the user is in a dangerous state, the rescue request apparatus 20 photographs surroundings of the rescue request apparatus 20 including the user and thereby generates images thereof, and transmits a rescue request signal including the generated images. Therefore, by using the rescue request apparatus 20 according to this example embodiment, a rescuer can prepare therapeutic instruments and the like necessary to rescue the user in advance and rescue the user by using the prepared instruments. Therefore, by using the rescue request apparatus 20 according to this example embodiment, it is possible to rescue the user without a hitch.

Further, while the rescue request apparatus 20 is driving the rescue request apparatus 20 so as to trace the movement trajectory, it successively photographs surroundings of the rescue request apparatus 20 and thereby successively generates images thereof, and transmits a rescue request signal including the generated images. Therefore, by using the rescue request apparatus 20 according to this example embodiment, a rescuer can make his/her way along the route along which the user has moved while checking the images generated by the rescue request apparatus 20. Therefore, by using the rescue request apparatus 20 according to this example embodiment, the rescuer can quickly rescue the user of the rescue request apparatus 20.

Third Example Embodiment

Figure 7:
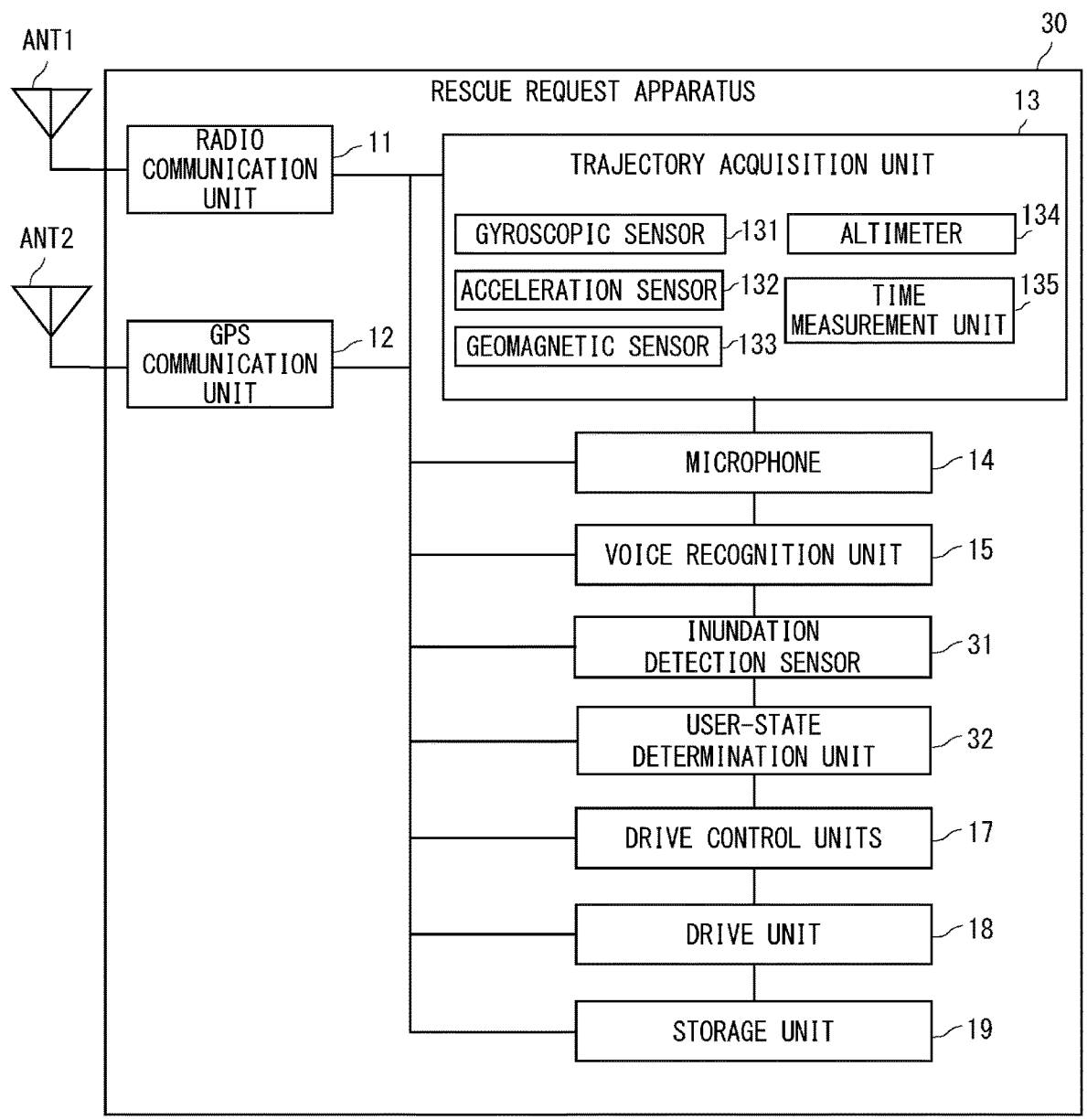
FIG. 7 is a block diagram showing an example of a configuration of a rescue request apparatus according to a third example embodiment.

Next, a third example embodiment will be described. The third example embodiment is a modified example of the first and second example embodiments. Therefore, the third example embodiment will be described with reference to the first example embodiment. A configuration example of a rescue request apparatus 30 according to the third example embodiment will be described with reference to FIG. 7. FIG. 7 is a block diagram showing an example of a configuration of the rescue request apparatus according to the third example embodiment.

The rescue request apparatus 30 according to the third example embodiment has a configuration that is obtained by adding an inundation detection sensor 31 in the configuration of the first example embodiment. Further, in the rescue request apparatus 30 according to the third example embodiment, the user-state determination unit 16 in the first example embodiment is replaced by a user-state determination unit 32. Note that the rest of the configuration is similar to that of the first example embodiment and hence only the differences therefrom will be described in this example embodiment.

The inundation detection sensor 31 is a sensor that detects that the rescue request apparatus 30 is inundated with water. Further, the inundation detection sensor 31 is disposed at the bottom of the rescue request apparatus 30, and can detect how high the rescue request apparatus 30 is inundated with water as measured from the bottom thereof. Since the inundation detection sensor 31 is the sensor that detects how much the rescue request apparatus 30 is inundated with water, it can also be regarded as a sensor that acquires information about a state of the rescue request apparatus 30.

When the rescue request apparatus 30 is inundated with water, the inundation detection sensor 31 notifies the user-state determination unit 32 of a detected value. Note that the inundation detection sensor 31 may be disposed inside the rescue request apparatus 30, or may be disposed outside the rescue request apparatus 30 and connected thereto.

The user-state determination unit 32 determines whether or not the value detected by the inundation detection sensor 31 is larger than a predetermined threshold. When it is determined that the value detected by the inundation detection sensor 31 is larger than the predetermined threshold, it may be inferred that the user is about to be drowned, so that the user-state determination unit 32 determines that the user is in a dangerous state.

Next, an example of operations performed by the rescue request apparatus 30 according to the third example embodiment will be described. The example of operations performed by the rescue request apparatus 30 according to the third example embodiment is basically similar to that of the first example embodiment, and therefore only the differences therefrom will be described with reference to the flowchart shown in FIG. 4.

In this example embodiment, the process in the step S13 is different from that in the first example embodiment. In the first example embodiment, when the speech recognition unit 15 recognizes a term indicating a rescue request in the step S13, the user-state determination unit 16 determines that the user is in a dangerous state. In this example embodiment, in the step S13, the user-state determination unit 32 further determines whether or not the user is in a dangerous state by using the value detected by the inundation detection sensor 31.

Specifically, the user-state determination unit 32 determines whether or not the value detected by the inundation detection sensor 31 is equal to or larger than a predetermined threshold. Then, when the value detected by the inundation detection sensor 31 is equal to or larger than the predetermined threshold, the user-state determination unit 32 determines that the user is in a dangerous state. Note that the user-state determination unit 32 may be configured so as to determine whether or not the user is in a dangerous state by using only the value detected by the inundation detection sensor 31.

As described above, in this example embodiment, the rescue request apparatus 30 further includes the inundation detection sensor 31, and the user-state determination unit 32 determines whether or not the user is in a dangerous state based on the value detected by the inundation detection sensor 31. Therefore, according to the rescue request apparatus 30 in accordance with this example embodiment, it is possible to make a rescue request even when the user is about to be drowned.

Fourth Example Embodiment

Figure 8:
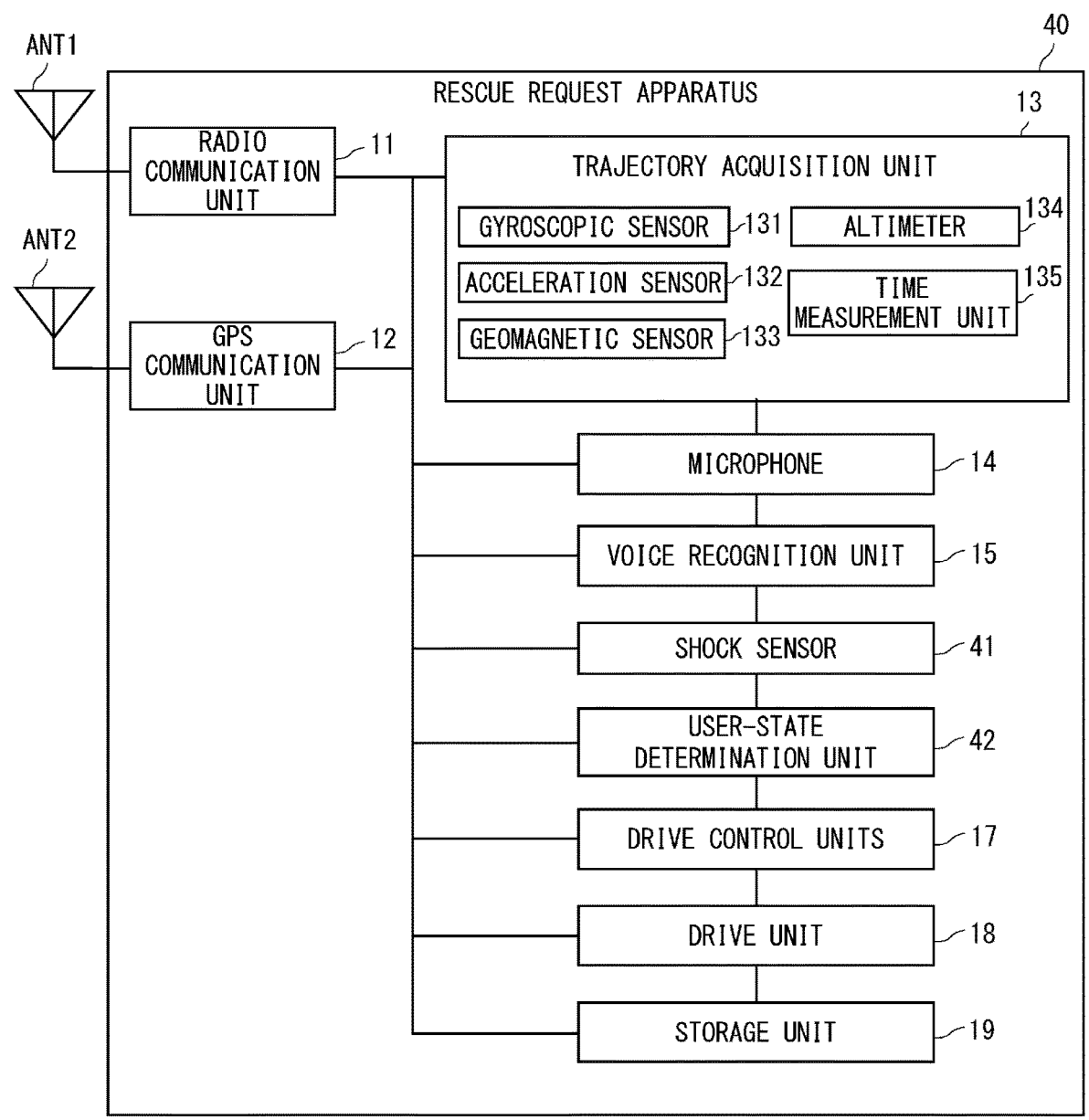
FIG. 8 is a block diagram showing an example of a configuration of a rescue request apparatus according to a fourth example embodiment.

Next, a fourth example embodiment will be described. The fourth example embodiment is a modified example of the first to third example embodiments. Therefore, the fourth example embodiment will be described with reference to the first example embodiment. Firstly, an example of a configuration of a rescue request apparatus 40 according to the fourth example embodiment will be described with reference to FIG. 8. FIG. 8 is a block diagram showing an example of a configuration of the rescue request apparatus according to the fourth example embodiment.

The rescue request apparatus 40 according to the fourth example embodiment further includes a shock sensor 41 in the configuration of the first example embodiment. Further, in the rescue request apparatus 40 according to the fourth example embodiment, the user-state determination unit 16 in the first example embodiment is replaced by a user-state determination unit 42. Note that the rest of the configuration is similar to that of the first example embodiment and hence only the differences therefrom will be described in this example embodiment.

The shock sensor 41 is, for example, a shock sensor using piezoelectric ceramics, and is a sensor capable of measuring the strengths of vibrations and an impact exerted in the rescue request apparatus 40. Since the shock sensor 41 is a sensor that detects the strengths of vibrations and an impact exerted in the rescue request apparatus 40, it can also be regarded as a sensor that acquires information about a state of the rescue request apparatus 40. A notification about a value detected by the shock sensor 41 is sent to the user-state determination unit 42. Note that the shock sensor 41 may be disposed inside the rescue request apparatus 40, or may be disposed outside the rescue request apparatus 40 and connected thereto.

The user-state determination unit 42 determines whether or not the value detected by the shock sensor 41 is larger than a predetermined threshold. When it is determined that the value detected by the shock sensor 41 is larger than the predetermined threshold, it may be inferred that the user has fallen off, so that the user-state determination unit 42 determines that the user is in a dangerous state.

Next, an example of operations performed by the rescue request apparatus 40 according to the fourth example embodiment will be described. The example of operations performed by the rescue request apparatus 40 according to the fourth example embodiment is basically similar to that of the first example embodiment, and therefore only the differences therefrom will be described with reference to the flowchart shown in FIG. 4.

In this example embodiment, the process in the step S13 is different from that in the first example embodiment. In the first example embodiment, when the speech recognition unit 15 recognizes a term indicating a rescue request in the step S13, the user-state determination unit 16 determines that the user is in a dangerous state. In this example embodiment, in the step S13, the user-state determination unit 42 further determines whether or not the user is in a dangerous state by using the value detected by the shock sensor 41.

Specifically, the user-state determination unit 42 determines whether or not the value detected by the shock sensor 41 is equal to or larger than a predetermined threshold. Then, when the value detected by the shock sensor 41 is equal to or larger than the predetermined threshold, the user-state determination unit 42 determines that the user is in a dangerous state. Note that the user-state determination unit 42 may be configured so as to determine whether or not the user is in a dangerous state by using only the value detected by the shock sensor 41.

As described above, in this example embodiment, the rescue request apparatus 40 further includes the shock sensor 41, and the user-state determination unit 42 determines whether or not the user is in a dangerous state based on the value detected by the shock sensor 41. Therefore, according to the rescue request apparatus 40 in accordance with this example embodiment, it is possible to make a rescue request even when the user has fallen off.

Fifth Example Embodiment

Figure 9:
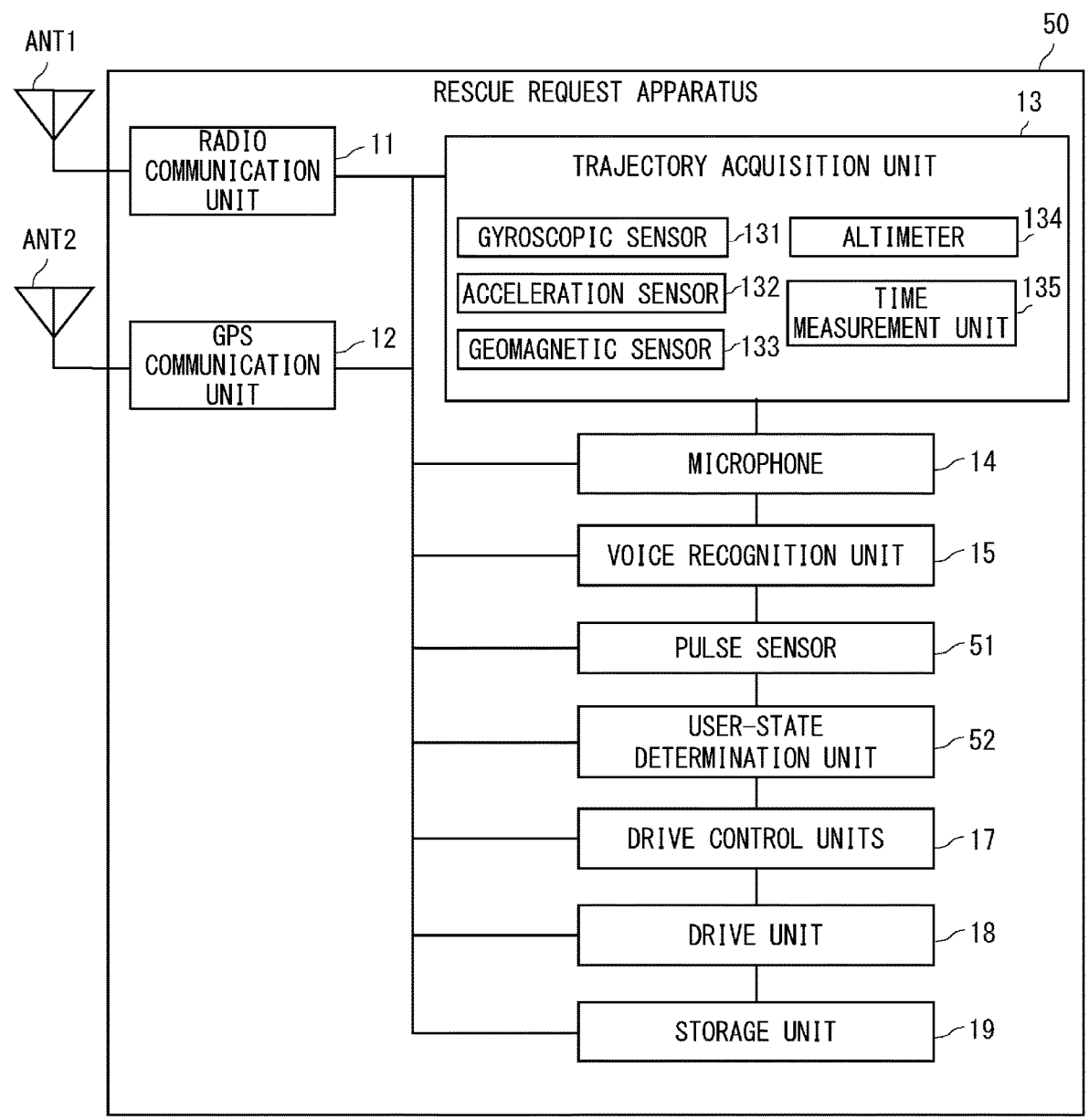
FIG. 9 is a block diagram showing an example of a configuration of a rescue request apparatus according to a fifth example embodiment.

Next, a fifth example embodiment will be described. The fifth example embodiment is a modified example of first to fourth example embodiments. Therefore, the fifth example embodiment will be described with reference to the first example embodiment. Firstly, an example of a configuration of a rescue request apparatus 50 according to the fifth example embodiment will be described with reference to FIG. 9. FIG. 9 is a block diagram showing an example of a configuration of the rescue request apparatus according to the fifth example embodiment.

The rescue request apparatus 50 according to the fifth example embodiment further includes a pulse sensor 51 in the configuration of the first example embodiment. Further, in the rescue request apparatus 50 according to the fifth example embodiment, the user-state determination unit 16 in the first example embodiment is replaced by a user-state determination unit 52. Note that the rest of the configuration is similar to that of the first example embodiment and hence only the differences therefrom will be described in this example embodiment.

The pulse sensor 51 is a sensor that measures the pulse of a user. The pulse sensor 51 is attached to, for example, an arm of the user.

The pulse sensor 51 connects to and communicates with the rescue request apparatus 50 by, for example, Bluetooth (Registered Trademark) or the like. The rescue request apparatus 50 and the pulse sensor 51 periodically measure the pulse of the user and notify the user-state determination unit 52 of the measured pulse rate. Since the pulse of the user is his/her biometric information, the pulse sensor 51 can also be regarded as a sensor that acquires biometric information of the user. Note that although the sensor in this example embodiment is described as the pulse sensor, it may be a biological information sensor that measures the blood pressure, the body temperature, or the breathing rate of the user, or may be a biological information sensor that acquires information about two or more of the blood pressure, the body temperature, and the breathing rate of the user.

The user-state determination unit 52 determines whether or not the user is in a dangerous state based on the information about the pulse rate sent from the pulse sensor 51. The user-state determination unit 52 determines whether or not the user is in a dangerous state based on whether or not the pulse rate of the user is within a normal range. In this case, the user-state determination unit 52 may determine that the user is in a dangerous state when at least one of the following conditions is satisfied: a condition that the pulse rate sent from the pulse sensor 51 is equal to or higher than a first determination threshold; and a condition that the pulse rate is lower than a second determination threshold. Alternatively, when a difference between a pulse rate sent from the pulse sensor 51 and a pulse rate measured under the normal condition is equal to or larger than a predetermined threshold, it may be inferred that the user is not in the normal condition, so that the user-state determination unit 52 may determine that the user is in a dangerous state.

Next, an example of operations performed by the rescue request apparatus 50 according to the fifth example embodiment will be described. The example of operations performed by the rescue request apparatus 50 according to the fifth example embodiment is basically similar to that of the first example embodiment, and therefore only the differences therefrom will be described with reference to the flowchart shown in FIG. 4.

In this example embodiment, the process in the step S13 is different from that in the first example embodiment. In the first example embodiment, when the speech recognition unit 15 recognizes a term indicating a rescue request in the step S13, the user-state determination unit 16 determines that the user is in a dangerous state. In this example embodiment, in the step S13, the user-state determination unit 52 further determines whether or not the user is in a dangerous state by using the pulse rate detected by the pulse sensor 51.

The user-state determination unit 52 may determine that the user is in a dangerous state when at least one of the following conditions is satisfied: the condition that the pulse rate sent from the pulse sensor 51 is equal to or higher than the first determination threshold; and the condition that the pulse rate sent from the pulse sensor 51 is lower than the second determination threshold. Alternatively, when a difference between a pulse rate sent from the pulse sensor 51 and a pulse rate measured under the normal condition is equal to or larger than a predetermined threshold, it may be inferred that the user is not in the normal condition, so that the user-state determination unit 52 may determine that the user is in a dangerous state. Note that the user-state determination unit 52 may be configured so as to determine whether or not the user is in a dangerous state by using only the pulse rate measured by the pulse sensor 51.

As described above, in this example embodiment, the rescue request apparatus 50 further includes the pulse sensor 51, and the user-state determination unit 52 determines whether or not the user is in a dangerous state based on the value detected by the pulse sensor 51. Therefore, according to the rescue request apparatus 50 in accordance with this example embodiment, it is possible to make a rescue request even when a user is unable to move such as when the user has lost consciousness.

Other Example Embodiment

Figure 10:
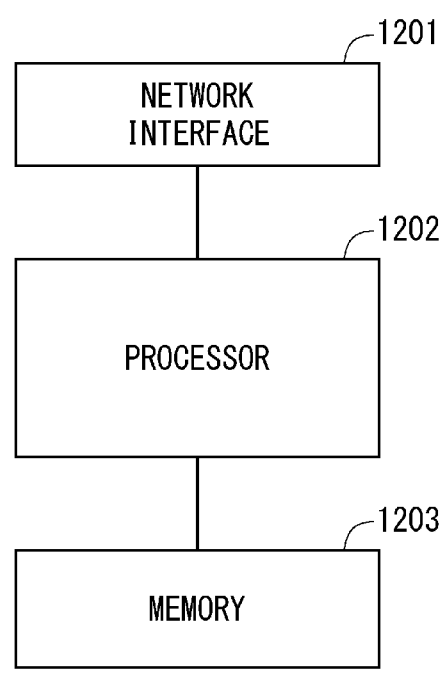
FIG. 10 is a schematic configuration diagram showing an example of a configuration of a rescue request apparatus according to another example embodiment.

FIG. 10 is a block diagram showing an example of the configuration of each of the rescue request apparatuses 1, 10, 20, 30, 40, and 50 (hereinafter referred to as the rescue request apparatus 1 and the like) described in the above-described example embodiments. Referring to FIG. 10, each of the rescue request apparatus 1 and the like includes a network interface 1201, a processor 1202, and a memory 1203. The network interface 1201 is used for communication with other radio communication apparatuses. The network interface 1201 may include, for example, a network interface card (NIC) in conformity with IEEE 802.3 series.

The processor 1202 may load software (a computer program) from the memory 1203 and execute the loaded software, thereby performing the processes of the rescue request apparatus 1 or the like described by using the flowchart in the above-described embodiments. The processor 1202 may be, for example, a microprocessor, an MPU (Micro Processing Unit), or a CPU (Central Processing Unit). The processor 1202 may include a plurality of processors.

The memory 1203 is formed by a combination of a volatile memory and a nonvolatile memory. The memory 1203 may include a storage located remotely from the processor 1202. In this case, the processor 1202 may access the memory 1203 through an I/O interface (not shown).

In the example shown in FIG. 10, the memory 1203 is used to store a group of software modules. The processor 1202 may load the group of software modules from the memory 1203 and execute the loaded software module, thereby performing the processes of the rescue request apparatus 1 or the like described in the above-described embodiments.

As described above with reference to FIG. 10, each of the processors included in the rescue request apparatus 1 or the like executes one or a plurality of programs including a group of instructions for causing a computer to perform the algorithm described above with reference to the drawings.

In the above-described examples, the program may be stored in various types of non-transitory computer readable media and thereby supplied to the computer. The non-transitory computer readable media includes various types of tangible storage media. Examples of the non-transitory computer readable media include a magnetic recording medium (such as a flexible disk, a magnetic tape, and a hard disk drive) and a magneto-optic recording medium (such as a magneto-optic disk). Further, examples of the non-transitory computer readable media include CD-ROM (Read Only Memory), CD-R, and CD-R/W.

Further, examples of the non-transitory computer readable media include a semiconductor memory. The semiconductor memory includes, for example, a mask ROM, a PROM (Programmable ROM), an EPROM (Erasable PROM), a flash ROM, and a RAM (Random Access Memory).

These programs may be supplied to the computer by using various types of transitory computer readable media. Examples of the transitory computer readable media include an electrical signal, an optical signal, and an electromagnetic wave. The transitory computer readable media can be used to supply programs to the computer through a wired communication line (e.g., electric wires and optical fibers) or a wireless communication line.

Although the present invention is described above with reference to example embodiments, the present invention is not limited to the above-described example embodiments. Various modifications that can be understood by those skilled in the art can be made to the configuration and details of the present invention within the scope of the invention. Further, the present disclosure may be implemented by combining those example embodiments as appropriate.

Further, the whole or part of the example embodiments disclosed above can be described as, but not limited to, the following supplementary notes.

(Supplementary Note 1)
A rescue request apparatus comprising:
a radio communication unit configured to perform radio communication;
a trajectory acquisition unit configured to acquire a movement trajectory of the rescue request apparatus when the radio communication cannot be performed by the radio communication unit;
a user-state determination unit configured to determine whether or not a user is in a dangerous state; and
a drive control unit configured to drive and control the rescue request apparatus so as to trace the movement trajectory acquired by the trajectory acquisition unit when the user-state determination unit determines that the user is in the dangerous state, wherein the radio communication unit transmits a rescue request signal to a pre-registered destination when the radio communication becomes possible.

(Supplementary Note 2)
The rescue request apparatus described in Supplementary note 1, wherein the radio communication unit transmits the rescue request signal including trajectory information about the movement trajectory acquired by the trajectory acquisition unit.

(Supplementary Note 3)
The rescue request apparatus described in Supplementary note 1 or 2, further comprising a GPS communication unit configured to perform positioning by receiving a GPS (Global Positioning System) signal, wherein the trajectory acquisition unit acquires the movement trajectory of the rescue request apparatus when at least one of following conditions is satisfied: a condition that the radio communication cannot be performed by the radio communication unit; and a condition that the positioning by the GPS signal cannot be performed.

(Supplementary Note 4)
The rescue request apparatus described in Supplementary note 3, wherein the trajectory acquisition unit acquires the movement trajectory by periodically acquiring a current position from a place where at least one of the following conditions is satisfied: the condition that the radio communication cannot be performed by the radio communication unit; and the condition that the positioning by the GPS signal cannot be performed, to a place where the user-state determination unit determines that the user is in a dangerous state.

(Supplementary Note 5)
The rescue request apparatus described in any one of Supplementary notes 1 to 4, further comprising a voice recognition unit configured to recognizes a voice uttered by the user, wherein
the user-state determination unit determines that the user is in a dangerous state when the voice recognition unit recognizes a first term indicating a rescue request.

(Supplementary Note 6)
The rescue request apparatus described in any one of Supplementary notes 1 to 5, further comprising an image pickup unit configured to photograph surroundings of the rescue request apparatus including the user and thereby generate an image thereof when the user-state determination unit determines that the user is in a dangerous state, wherein
the radio communication unit transmits the rescue request signal including the image generated by the image pickup unit.

(Supplementary Note 7)
The rescue request apparatus described in Supplementary note 6, wherein the image pickup unit successively photographs the surroundings of the rescue request apparatus and generates images thereof while the rescue request apparatus is moving so as to trace the movement trajectory.

(Supplementary Note 8)
The rescue request apparatus described in any one of Supplementary notes 1 to 7, further comprising a first sensor configured to acquire information about a state of the rescue request apparatus, wherein
the user-state determination unit determines that the user is in a dangerous state when the information about the state of the rescue request apparatus acquired by the first sensor is equal to or larger than a first threshold.

(Supplementary Note 9)
The rescue request apparatus described in any one of Supplementary notes 1 to 8, further comprising a second sensor configured to acquire biometric information of the user, wherein
the user-state determination unit determines that the user is in a dangerous state when at least one of following conditions is satisfied: a condition that the biometric information of the user acquired by the second sensor is equal to or larger than a second threshold; and a condition that the biometric information of the user is smaller than a third threshold.

(Supplementary Note 10)
The rescue request apparatus described in any one of Supplementary notes 1 to 9, further comprising a voice recognition unit configured to recognize a voice uttered by the user, wherein
the drive control unit stops the driving and controlling of the rescue request apparatus when the voice recognition unit recognizes a second term indicating that the driving and controlling of the rescue request apparatus should be stopped while the drive control unit is driving and controlling the rescue request apparatus.

(Supplementary Note 11)
A rescue request method comprising:
acquiring a movement trajectory of an own apparatus when radio communication cannot be performed by a radio communication unit configured to perform radio communication;
determining whether or not a user is in a dangerous state;
driving and controlling the own apparatus so as to trace the acquired movement trajectory when it is determined that the user is in the dangerous state; and transmitting a rescue request signal to a pre-registered destination when the radio communication becomes possible.

(Supplementary Note 12)

A program for causing a computer to perform:

acquiring a movement trajectory of an own apparatus when radio communication cannot be performed by a radio communication unit configured to perform radio communication;

determining whether or not a user is in a dangerous state;

driving and controlling the own apparatus so as to trace the acquired movement trajectory when it is determined that the user is in the dangerous state; and transmitting a rescue request signal to a pre-registered destination when the radio communication becomes possible.

This application is based upon and claims the benefit of priority from Japanese patent application No. 2018-004230, filed on Jan. 15, 2018, the disclosure of which is incorporated herein in its entirety by reference.

REFERENCE SIGNS LIST 1, 10, 20, 30, 40, 50 RESCUE REQUEST APPARATUS
2, 11 RADIO COMMUNICATION UNIT
3, 13 TRAJECTORY ACQUISITION UNIT
4, 16, 32, 42, 52 USER-STATE DETERMINATION UNIT
5, 17 DRIVE CONTROL UNITS
12 GPS COMMUNICATION UNIT
14 MICROPHONE
15 VOICE RECOGNITION UNIT
18 DRIVE UNIT
19 STORAGE UNIT
21 IMAGE PICKUP UNIT
31 INUNDATION DETECTION SENSOR
41 SHOCK SENSOR
51 PULSE SENSOR
131 GYROSCOPIC SENSOR
132 ACCELERATION SENSOR
133 GEOMAGNETIC SENSOR
134 ALTIMETER
135 TIME MEASUREMENT UNIT

What is claimed is:

1. A rescue request apparatus comprising:
a processor; and
a memory storing instructions executable by the processor to:
acquire a movement trajectory of the rescue request apparatus in response to determining that radio communication cannot be performed;
determine whether or not a user is in a dangerous state;
drive and control the rescue request apparatus so as to trace the movement trajectory in response to determining that the user is in the dangerous state; and
a rescue request signal to a pre-registered destination in response to determining that the radio communication has become possible.

2. The rescue request apparatus according to claim 1, wherein the the rescue request signal that is transmitted includes trajectory information about the movement trajectory.

3. The rescue request apparatus according to claim 1, wherein
the movement trajectory of the rescue request apparatus is acquired when at least one of following conditions is satisfied: the radio communication cannot be performed; and a GPS (Global Positioning System) signal cannot be acquired.

4. The rescue request apparatus according to claim 3, wherein the movement trajectory is acquired by periodically acquiring a current position from a place where at least one of the following conditions is satisfied: the radio communication cannot be performed the GPS signal cannot be acquired, to a place where the user is in the dangerous state.

5. The rescue request apparatus according to claim 1, wherein the instructions are executable by the processor to further recognize a voice uttered by the user, wherein
the user is determined to be in the dangerous state when the voice uttered by the user includes a term indicating a rescue request.

6. The rescue request apparatus according to claim 1, further comprising a camera that captures an image of surroundings of the rescue request apparatus including the user when the user is determined to be in the dangerous state, wherein
the rescue request signal that is transmitted includes the image.

7. The rescue request apparatus according to claim 6, wherein the image is one of a plurality of images of the surroundings of the rescue request apparatus that are successively captured by the camera while the rescue request apparatus is moving so as to trace the movement trajectory.

8. The rescue request apparatus according to claim 1, further comprising a sensor configured to acquire information about a state of the rescue request apparatus, wherein
the user is determined to be in the dangerous state when the information about the state of the rescue request apparatus is equal to or larger than a first threshold.

9. The rescue request apparatus according to claim 1, further comprising a sensor configured to acquire biometric information of the user, wherein
the user is determined to be in the dangerous state when at least one of following conditions is satisfied: a condition that the biometric information of the user is equal to or larger than a threshold; and the biometric information is smaller than a different threshold.

10. The rescue request apparatus according to claim 1, wherein the instructions are executable by the processor to further:
recognize a voice uttered by the user; and
stops driving and controlling of the rescue request apparatus when the voice uttered by the user includes a term indicating that the driving and controlling of the rescue request apparatus should be stopped while the rescue request apparatus is being driven and controlled.

11. The rescue request apparatus according to claim 1, wherein the instructions are executable by the processor to further acquire a time that has been taken for movement from a start point position to an end point position of the movement trajectory.

12. The rescue request apparatus according to claim 3, further comprising:
a gyroscopic sensor that detects a rotational angular speed of the rescue request apparatus;
an acceleration sensor that detects an acceleration of the rescue request apparatus; and
a geomagnetic sensor that detects a direction of the rescue request apparatus, wherein
the instructions are executable by the processor to further acquire a current position of the rescue request apparatus every predetermined time on a basis of data detected by the gyroscopic sensor, the acceleration sensor, and the geomagnetic sensor to acquire the movement trajectory when the GPS signal cannot be acquired.

13. A rescue request method comprising:

acquiring, by a rescue request apparatus, a movement trajectory of the rescue request apparatus in response to determining that radio communication cannot be performed;

determining, by the rescue request apparatus, whether or not a user is in a dangerous state;

driving and controlling, by the rescue request apparatus, the rescue request apparatus so as to trace the movement trajectory in response to determining that the user is in the dangerous state; and transmitting, by the rescue request apparatus, a rescue request signal to a pre-registered destination in response to determining that the radio communication has become possible.

14. A non-transitory computer readable medium storing a program for executable by a rescue request apparatus to perform:

acquiring a movement trajectory of the rescue request apparatus in response to determining that radio communication cannot be performed;

determining whether or not a user is in a dangerous state;

driving and controlling the rescue request apparatus so as to trace the movement trajectory in response to determining that the user is in the dangerous state; and transmitting a rescue request signal to a pre-registered destination in response to determining that the radio communication has become possible.

\* \* \* \* \*